(12) United States Patent
Froschle et al.

(10) Patent No.: US 8,172,304 B2
(45) Date of Patent: May 8, 2012

(54) FOLDING ROOF ARRANGEMENT WITH ELASTICALLY DEFORMABLE TENSIONING ELEMENTS PIVOTALLY ATTACHED TO A SUPPORT STRUCTURE OF A VEHICLE

(75) Inventors: Mathias Froschle, Ostfildern (DE); Hanno Weber, Weilder Stadt (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 248 days.

(21) Appl. No.: 12/481,127

(22) Filed: Jun. 9, 2009

(65) Prior Publication Data

US 2010/0026040 A1 Feb. 4, 2010

(30) Foreign Application Priority Data

Aug. 1, 2008 (DE) .................. 10 2008 036 906

(51) Int. Cl.
*B60J 10/10* (2006.01)
(52) U.S. Cl. ........................................... 296/107.12
(58) Field of Classification Search ............ 296/107.01, 296/117, 107.17, 107.12, 121, 219, 116, 296/107.07, 107.08, 107.09, 108
See application file for complete search history.

(56) References Cited

U.S. PATENT DOCUMENTS

| | | | | |
|---|---|---|---|---|
| 4,991,902 A * | 2/1991 | Schrader et al. | ......... | 296/107.09 |
| 5,000,211 A * | 3/1991 | Speare et al. | ................... | 135/97 |
| 5,004,291 A * | 4/1991 | Bauer et al. | .................... | 296/116 |
| 5,259,658 A * | 11/1993 | Koppenstein et al. | ... | 296/107.12 |
| 5,335,959 A * | 8/1994 | Schrader et al. | .............. | 296/108 |
| 5,746,470 A * | 5/1998 | Seel et al. | ....................... | 296/108 |
| 5,816,644 A * | 10/1998 | Rothe et al. | ............. | 296/107.18 |
| 6,039,382 A * | 3/2000 | Mather et al. | ............ | 296/107.01 |
| 6,139,087 A * | 10/2000 | Wolfmaier et al. | ....... | 296/107.16 |
| 6,141,934 A * | 11/2000 | Zeigler | ............................ | 52/646 |
| 6,237,986 B1 * | 5/2001 | Neubrand et al. | ........ | 296/107.01 |
| 6,390,531 B1 * | 5/2002 | Schutt | ....................... | 296/107.13 |
| 6,454,342 B2 * | 9/2002 | Heselhaus et al. | ........ | 296/107.07 |
| 6,565,139 B2 * | 5/2003 | Bayerle et al. | ............... | 296/77.1 |
| 6,578,898 B2 * | 6/2003 | Rothe et al. | ............. | 296/107.07 |
| 6,659,533 B1 * | 12/2003 | Grubbs | ..................... | 296/107.07 |
| 6,796,595 B2 * | 9/2004 | Doncov | .................... | 296/107.09 |
| 6,811,204 B2 * | 11/2004 | Long | ............................. | 296/102 |
| 6,871,899 B2 * | 3/2005 | Mandl et al. | .............. | 296/107.12 |
| 7,246,841 B2 * | 7/2007 | Dilluvio | ................... | 296/107.09 |
| 7,392,816 B2 * | 7/2008 | Porter et al. | .................. | 135/123 |

(Continued)

FOREIGN PATENT DOCUMENTS

DE 19543243 11/1995

(Continued)

*Primary Examiner* — Kiran B Patel
(74) *Attorney, Agent, or Firm* — Gerald E. Hespos; Michael J. Porco (57) ABSTRACT

A folding roof arrangement has a folding top covering (12) and a folding top structure (14). The folding top structure (14) has at least one roof frame (20) with a front area and at least one elastically deformable tensioning element (31-34). The folding top structure (14) can be folded or collapsed with or without the folding top covering (12), so that the tensioning element (31-34) is elastically deformed when folded.

18 Claims, 6 Drawing Sheets

U.S. PATENT DOCUMENTS

| | | | |
|---|---|---|---|
| 7,506,914 B2 * | 3/2009 | Schonhorst et al. | 296/107.04 |
| 7,690,716 B2 * | 4/2010 | Dilluvio | 296/107.09 |
| 2010/0026038 A1 * | 2/2010 | Froschle | 296/107.12 |
| 2010/0026039 A1 * | 2/2010 | Froschle | 296/107.12 |
| 2010/0026041 A1 * | 2/2010 | Froschle et al. | 296/107.12 |
| 2010/0078925 A1 * | 4/2010 | Froschle | 280/756 |
| 2010/0140974 A1 * | 6/2010 | Plettrichs et al. | 296/107.09 |
| 2010/0237651 A1 * | 9/2010 | Weber et al. | 296/107.17 |
| 2010/0259066 A1 * | 10/2010 | Haberl et al. | 296/108 |

FOREIGN PATENT DOCUMENTS

| | | |
|---|---|---|
| DE | 199 16 692 | 5/2000 |
| DE | 202006012235 | 11/2006 |
| DE | 102005027511 | 12/2006 |
| DE | 102006014114 | 11/2007 |
| FR | 2 778 609 | 11/1999 |

* cited by examiner

FOLDING ROOF ARRANGEMENT WITH ELASTICALLY DEFORMABLE TENSIONING ELEMENTS PIVOTALLY ATTACHED TO A SUPPORT STRUCTURE OF A VEHICLE

CROSS REFERENCE TO RELATED APPLICATION

This application claims priority under 35 USC 119 to German Patent Application No. 10 2008 036 906.3 filed on Aug. 1, 2008, the entire disclosure of which is incorporated herein by reference.

BACKGROUND OF THE INVENTION

1. Field of the Invention

The invention relates to a folding roof arrangement for a motor vehicle.

2. Description of the Related Art

Published German Patent Application DE 199 16 692 A1 discloses a folding top for a motor vehicle having a windscreen frame. A section of a covering fabric of the top that faces the windscreen or windshield frame has a deformable tensioning element, which, in a closed position, extends and can be tensioned in a direction transverse to the vehicle longitudinal axis. The deformable tensioning element preferably is a reinforced fabric strip with an enclosed channel, in which a tensioning cable can be guided. French patent application FR 2 778 609 A1 discloses a motor vehicle having a folding top that is stretched by flexible elements. U.S. Pat. No. 6,811,204 B2 discloses a flexible roof hood that is stretched by flexible fiberglass rods.

The object of the invention is to provide a folding roof arrangement having: a folding top covering; a folding top structure that comprises at least one roof frame having a front area; and at least one elastically deformable tensioning element. The folding roof arrangement preferably is of simple construction and is capable of rapid folding or collapsing.

SUMMARY OF THE INVENTION

The invention relates to a folding roof arrangement that comprises: a folding top covering; a folding top structure that comprises at least one roof frame with a front area; and at least one elastically deformable tensioning element. The folding top structure can be folded or collapsed with or without the folding top covering, so that the tensioning element is elastically deformed when folded or collapsed. The folding top structure preferably has no links, such as those used in conventional folding roof arrangements. More particularly, a conventional link preferably is replaced by at least one tensioning element.

The elastically deformable tensioning element preferably extends from the front area of the roof frame to a rear area of the folding roof arrangement. The tensioning element may be arranged in the vehicle longitudinal direction or diagonally, for example, when the folding roof arrangement is closed.

The elastically deformable tensioning element preferably extends from the front area of the roof frame to a rear area of the folding roof arrangement, so that the folding top structure can be folded or collapsed with or without the folding top covering, and so that the tensioning element is deformed elastically when folded. The roof frame preferably is rigid in comparison to the elastically deformable tensioning element. The front area of the roof frame, in particular a roof frame front part, preferably can be locked to an upper cowl. Known folding top closures may be used for this purpose. A roof frame side part optionally may be provided on each side of the folding top structure.

At least one elastically deformable tensioning element preferably is provided for stretching the folding top covering when the folding roof arrangement is in a closed position. In this regard, the at least one elastically deformable tensioning element preferably is a bendable rod.

At least one elastically deformable tensioning element preferably extends from the rear area of the folding roof arrangement, which preferably is located in a rear end area of a motor vehicle, to the front area of the roof frame. This elastically deformable tensioning element or a further elastically deformable tensioning elements may run, at least partially, in a longitudinal direction, or diagonally or in a transverse direction of the motor vehicle. Combinations of these alignments also are possible.

The elastically deformable tensioning element in the folding top structure may have the function of a link. Conventional folding top structures may be constructed as a four-part linkage with a roof frame front part, roof frame side parts, a main bearing and a main link. However, the main link may be dispensed with in the folding top structure of the invention in that the at least one tensioning element assumes the function of the main link.

The elastically deformable tensioning element in the folding top structure may has the function of a folding top bow. Additionally, the folding top cover preferably is supported and/or stretched by the tensioning element when the folding roof arrangement is in the closed position.

The elastically deformable tensioning element in the folding top structure may have the function of a spring. The tensioning element can be bent, curved or otherwise deformed to achieve the spring action. Thus, an additional mechanical spring or gas-filled spring, as used in conventional folding top structures, can be dispensed with.

The elastically deformable tensioning element preferably is pre-tensioned and may be pre-tensioned against the folding top covering when the folding roof arrangement is in the closed position. Thus, the folding top covering is stretched stably.

The elastically deformable tensioning element preferably is pre-tensioned so that a pre-tensioning force of the elastically deformable tensioning element assists in a closing movement of the folding top structure and assists a stretching movement of the folding roof arrangement. As a result, the tensioning element acts as an elastic spring that produces a balancing of masses when closing the folding roof arrangement to facilitate closing the folding roof arrangement.

Plural elastically deformable tensioning elements preferably are fit to the roof frame. Each of the elastically deformable tensioning elements preferably is attached by one end to the roof frame. The other end of the elastically deformable tensioning elements preferably is attached to a support structure in the rear end area of a motor vehicle.

At least one, and preferably two, of the elastically deformable tensioning elements may extend, at least in part, in a longitudinal direction from the front area of the roof frame to the rear area of the roof arrangement. The explanations above primarily relate to the closed position of the folding roof arrangement. The arrangement of the tensioning elements in a stowed position is different from that in the closed position of the folding roof arrangement.

At least one, and preferably two, of the elastically deformable tensioning elements may extend, at least in part, diagonally from the front area of the roof frame to the rear area of the roof arrangement. This represents a simple way of stably stretching the folding top covering when the folding roof arrangement is in the closed position.

The elastically deformable tensioning element or some or all of the elastically deformable tensioning elements preferably are curved when the folding roof arrangement is in the folded or collapsed state and/or in the unfolded or stretched state. In the normal or untensioned state all of the tensioning elements preferably are straight. The tensioning elements preferably are curved to a greater or lesser degree both in the folded and in the unfolded state, so that they are pre-tensioned. The folded or collapsed state of the roof arrangement corresponds to the stowed position. The unfolded or stretched state of the roof arrangement corresponds to the closed position. In the folded state the tensioning elements preferably are arranged in a different plane or surface than in the unfolded state. Furthermore, in the folded state the tensioning elements preferably are curved more heavily than in the unfolded state to reduce the stowage space required.

The roof frame preferably comprises a roof frame front part and/or roof frame side parts, on which multiple elastically deformable tensioning elements are articulated. The tensioning elements preferably are articulated by their front ends so that the articulated end can swivel about a pivot axis. Alternatively the tensioning elements may be attached by ball joints.

Plural of the multiple elastically deformable tensioning elements may be articulated at various points on the roof frame front part and/or the roof frame side parts. Alternatively, two or more tensioning elements may be attached to a common articulation point.

The articulation or pivot axes of the elastically deformable tensioning elements on the roof frame front part and/or the roof frame side parts preferably each are inclined in relation to a Z axis. Thus, the tensioning elements perform a defined movement and/or are definably deformed under a folding movement or in collapsing of the folding roof arrangement. The Z axis relates to a motor vehicle, the longitudinal axis of which is denoted as the X axis and the transverse axis of which is denoted as the Y axis. The Z axis runs perpendicular to the X axis and the Y axis.

The roof frame preferably comprises two roof frame side parts, each of which is attached by one end to the roof frame front part. The roof frame side parts, which are also referred to as the roof side frame, may be articulated on the roof frame front part and each define a side window opening.

One end of each roof frame side part preferably is attached to a support structure of a motor vehicle and may be articulated on the support structure. The roof frame side part may be referred to as the B-pillar.

The roof frame side parts each may comprise at least two roof frame side part sections that are articulated to one another. The articulation preferably is designed so that the two roof frame side part sections can swivel about a pivot axis. One of the roof frames part sections preferably is connected firmly to the roof frame front part. The other roof frame side part section may be articulated on the support structure.

At least one of the elastically deformable tensioning elements may be articulated on a roof frame side part and preferably on a front area of the roof frame side part.

The folding roof arrangement preferably is characterized in that one or more elastically deformable tensioning elements are articulated on the roof frame and preferably on a front area of the roof frame.

The folding top covering preferably is fit detachably to the folding top structure. Detachable in this context preferably means repeatedly and non-destructively separable.

The elastically deformable tensioning element may be secured to the folding top covering or rigid folding top structure parts may be secured to the folding top covering. The elastically deformable tensioning element also may be integrated into the folding top covering. The folding top covering can be removed from the folding top structure together with the tensioning element. Alternatively, the tensioning element may remain on the folding top structure when the folding top covering is removed.

The elastically deformable tensioning element preferably is an elastic bending or bendable rod. The bendable rods preferably act as folding top bows and serve to support and stretch the folding top covering when the folding roof arrangement is in the closed position. The bendable rods also serve to synchronize the roof frame parts, in particular the roof frame side parts, when these parts are stowed. The bendable rods preferably are used in place of conventional links. The bendable rods preferably are made of a material that is elastically deformable and preferably a material that can be subjected to pre-tensioning. The front area of the roof frame, and particularly the roof frame front part, preferably is moved rearward, preferably in the direction of the vehicle rear end, when folding or collapsing the folding roof arrangement. Thus, the bendable rods are curved, deformed and tensioned heavily. The bendable rods take up less space in this heavily curved, tensioned or deformed state, and can be stowed in a spatially restricted stowage compartment in the rear end area of the vehicle. The bendable rod may be of a design color matched to the folding top covering and/or the vehicle interior trim. Alternatively, the bendable rod may be of a color purposely contrasting with the folding top covering and/or the vehicle interior trim.

At least one of the elastic bendable rod may have a substantially circular or oval cross section. Additionally or alternatively, at least one of the elastic bendable rods may have a rectangular cross section. The rectangular cross section preferably is oriented so that the rods bend or can be collapsed flexibly in a vehicle transverse direction and/or support the folding top covering, for example by a raised profile flank, in a vehicle longitudinal direction.

The elastic bendable rod may have a variable cross section and/or a predefined bending profile. For example the cross section may decrease or increase toward the middle or toward the ends. The bending profile preferably relates to the relaxed state of the bendable rod. The bendable rods may be pre-bent according to a desired folding top contour, with identical or differing radii of curvature.

Articulation or pivot axes of the elastically deformable tensioning elements on the support structure each may be inclined in relation to a Z axis so that the tensioning elements perform a defined movement and/or are definably deformed under a folding movement or when collapsing the folding roof arrangement. The Z axis relates to a motor vehicle, the longitudinal axis of which is denoted as the X axis and transverse axis of which is denoted as the Y axis. The Z axis runs perpendicular to the X axis and the Y axis.

The elastically deformable tensioning elements may be attached to the support structure for pivoting in three dimensions to allow for more complicated movement sequences when collapsing or folding the folding roof arrangement.

At least one end of at least one elastically deformable tensioning element may be attached to the support structure by a ball joint. A ball joint head may be joined integrally or unitarily to the associated bending rod.

The elastically deformable tensioning elements preferably are made to contrast by virtue of their design, shape and/or color with the folding top covering and/or the vehicle interior trim. The tensioning elements are visible in the vehicle interior.

The invention also relates to a motor vehicle, in particular a passenger car, having a folding roof arrangement as described above. The folding roof arrangement may be fit detachably or permanently to a support structure of the motor vehicle. In the case of a detachable fitting, the folding roof arrangement preferably is detached from the support structure in the closed position and is folded up and stowed separately. In the case of a permanent fitting, the folding roof arrangement is folded from the closed position into the stowed position and is stowed in a stowage compartment that preferably is in the rear end area of the motor vehicle.

The motor vehicle may be characterized in that the elastically deformable tensioning element is fit detachably or permanently to the support structure of the motor vehicle. Detachable in this context preferably means repeatedly and non-destructively separable. The deformable tensioning element may be fit detachably or permanently to the support structure directly or by way of further fasteners. Multiple tensioning elements also may be fit to a common fastener, which in turn is fit to the support structure.

The motor vehicle may be characterized in that the elastically deformable tensioning element is articulated detachably or permanently on the support structure of the motor vehicle. More particularly, one end of the tensioning element may be articulated on the support structure for swiveling about a pivot axis. Alternatively an articulation in the nature of a ball join may be provided.

The motor vehicle may be characterized in that at least two elastically deformable tensioning elements are attached to a common point on the support structure of the motor vehicle for easily synchronizing movement of the tensioning elements in the area of the joint. The tensioning elements preferably are attached to the support structure by their rear ends, that is to say the end facing the rear end area.

The motor vehicle may be characterized in that at least two elastically deformable tensioning elements are attached to the support structure of the motor vehicle at points spaced from one another in the vehicle transverse direction. This represents a simple way of providing a relatively large stretching area for the folding top covering.

The motor vehicle may be characterized in that the folding top structure can be folded or collapsed from a closed position into a stowed position, and vice versa, together with the folding top covering. In the closed position the folding top covering is stretched by the tensioning element, and preferably by plural tensioning elements, between the rear end area of the motor vehicle and a cowl above the windscreen. In the stowed position the folding top covering is folded or collapsed together with the folding top structure. However, the tensioning elements preferably are not folded but relatively heavily curved.

The motor vehicle may be characterized in that the elastically deformable tensioning element or plural elastically deformable tensioning elements are curved in the closed position and/or the stowed position. In the closed position the tensioning elements preferably are stretched in a curved area that extends from the upper cowl to the rear end area of the vehicle. However, the tensioning elements may be arranged straight when the folding roof arrangement is in the closed position. With the folding roof arrangement in the stowed position, the tensioning elements may be curved relatively heavily in substantially one plane or a relatively small stowage compartment.

The motor vehicle may be characterized in that the elastically deformable tensioning element or plural elastically deformable tensioning elements are curved differently in the closed position as compared to the stowed position. The curvature or even at least partially straight arrangement of the tensioning elements in the closed position ensues from the desired roof shape. The curvature of the tensioning elements in the stowed position preferably is selected to minimize the space taken up by the folding roof arrangement in the stowed position.

The motor vehicle may be characterized in that the elastically deformable tensioning element or plural elastically deformable tensioning elements are tensioned in the closed position and/or the stowed position. Tensioning or pre-tensioning the tensioning elements in the closed position stretches the folding top covering. Tensioning or pre-tensioning the tensioning elements in the stowed position is a simple way of generating a force to assist closing or stretching the folding roof arrangement from the stowed position.

Further advantages, features and details of the invention are set forth in the following description, in which various exemplary embodiments are described in detail, with reference to the drawings.

DETAILED DESCRIPTION OF THE PREFERRED EMBODIMENT

Figure 1:
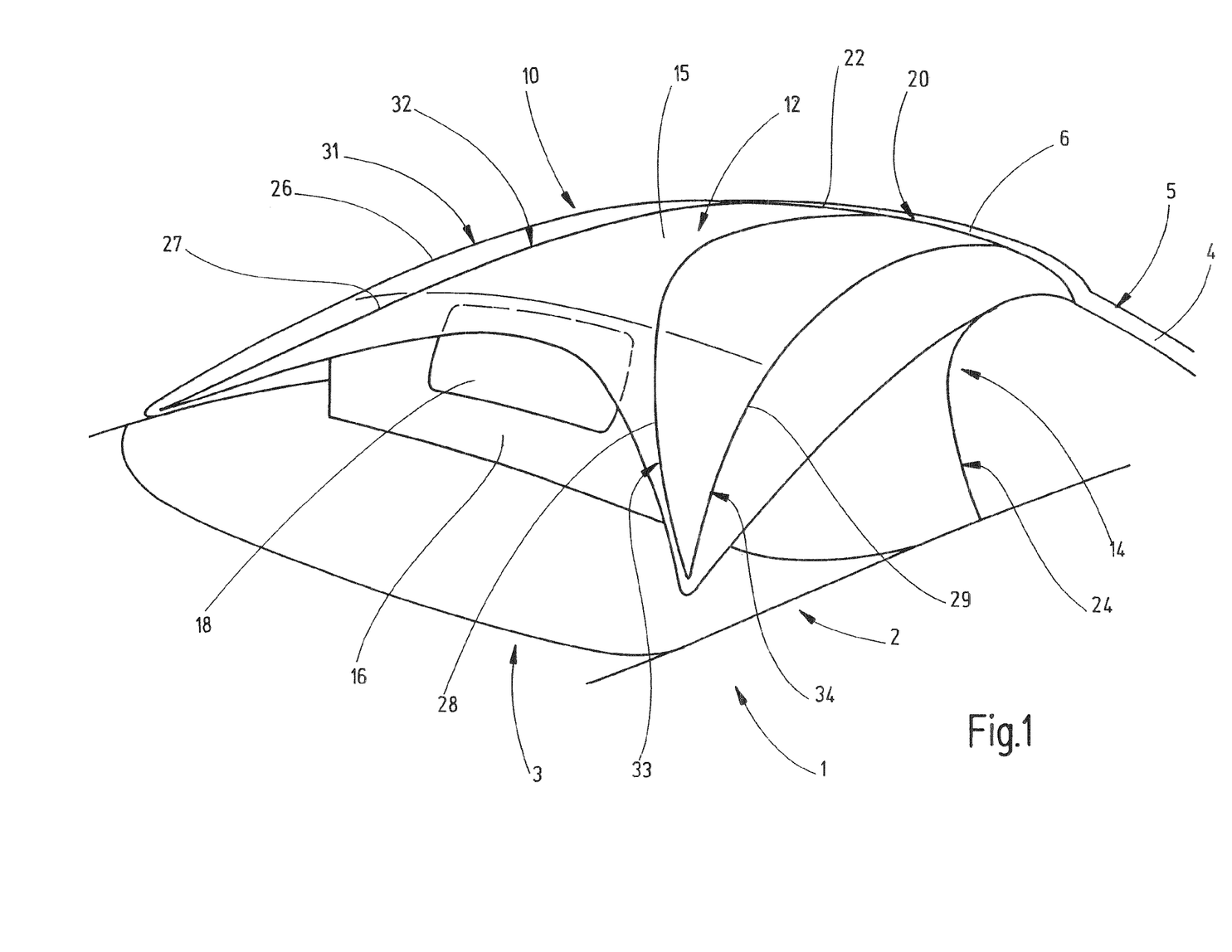
FIG. 1 is an oblique perspective representation of a passenger car from the rear, with a folding roof arrangement in the closed position.
Figure 2:
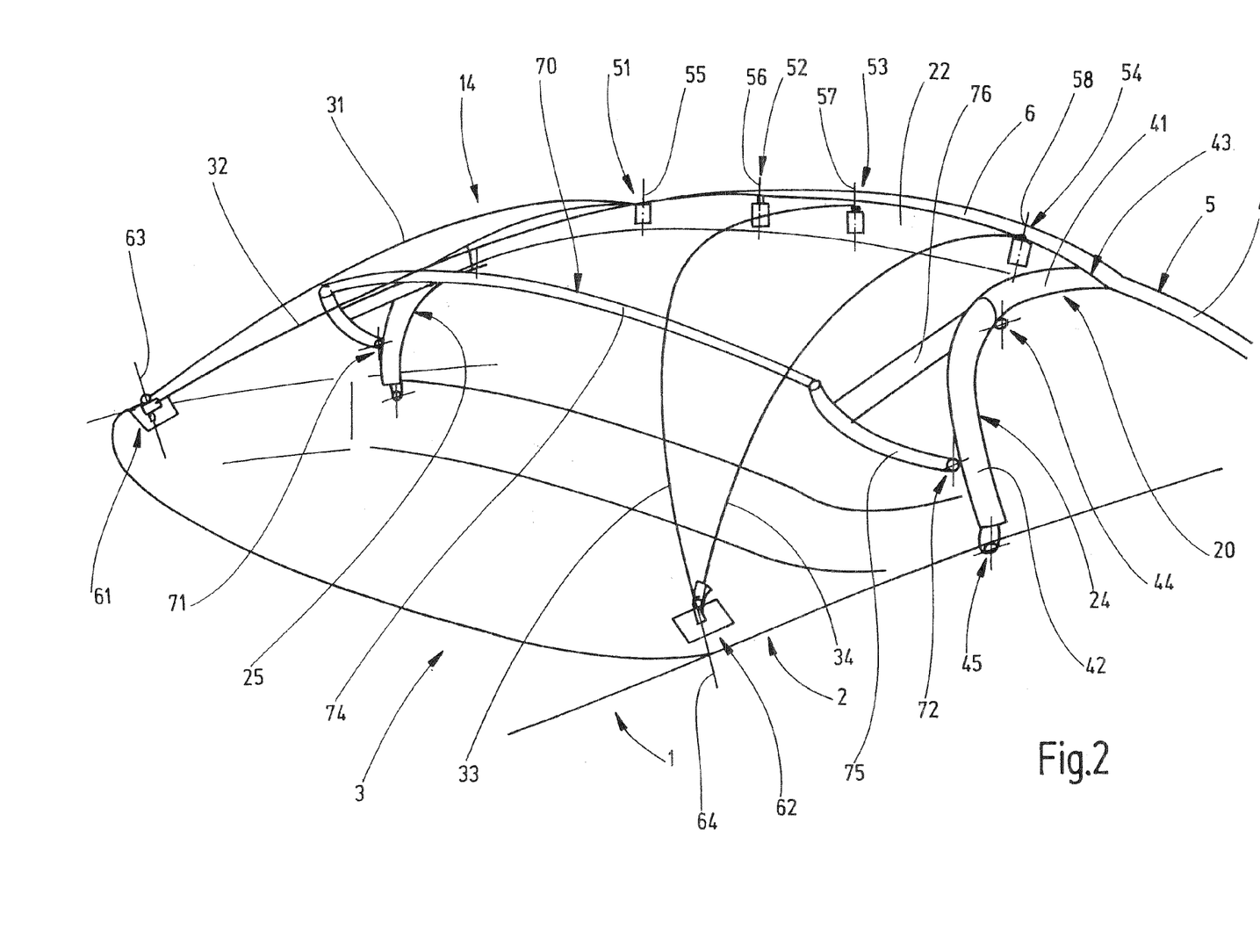
FIG. 2 is an oblique perspective representation similar to FIG. 1 without the folding top covering to reveal an underlying folding top structure.

FIGS. 1 to 4 represent a part of a passenger car 1 having a body 2, which also is referred to as the support structure, and a rear end area 3 in various views and states. FIGS. 1 and 2 show an A-pillar 4 that is part of a windscreen or windshield frame 5 that has an upper cowl 6. The passenger car 1 is a convertible, for example, or a sports coupe having an open construction, or a roadster.

A folding roof arrangement 10 extends from the rear end area 3 of the passenger car 1 to the cowl 6 of the windscreen frame 5. The folding roof arrangement 10 comprises a folding top covering 12 that is stretched on a folding top structure 14. The folding top covering 12 may be of one-piece design or, as shown, of multi-piece design with a main covering 15 and an additional covering 16. The additional covering 16 comprises a rear window 18 and may be connected firmly to the main covering 15, for example, by a seam.

The folding top structure 14 comprises a roof frame 20 having a roof frame front part 22 and two roof frame side parts 24, 25. The roof frame front part 22 can be fixed to the upper cowl 6, for example, by conventional closures. The roof frame side parts 24, 25 define an opening for a side window (not shown). Curved lines 26, 27, 28, 29 indicate edges produced by tensioning elements 31, 32, 33, 34 that are stretched under the folding top covering 12.

FIG. 2 represents the folding top structure 14 in the stretched state without the folding top covering 12. This stretched state also is referred to as the closed position of the folding roof arrangement 10. It will be seen from FIG. 2 that the roof frame side part 24, like the roof frame side part 25, comprises two roof frame side part sections 41, 42 that extend with differing degrees of curvature as an extension of the A-pillar 4. The front end of the roof frame part section 41 is connected firmly to the roof frame front part 22 at a joint 43, as can be seen from FIG. 3.

The two roof frame part sections 41, 42 are articulated at a further joint 44. The articulated connection at the joint 44 is designed so that the two roof frame part sections 41, 42 can swivel about a pivot axis, which is indicated by a cross and runs substantially in the vehicle transverse direction.

The roof frame part section 42 is articulated on a lateral support structure of the passenger car 1 at a further joint 45. The joint 45 is designed so that the roof frame part section 42 can swivel about a pivot axis, which is indicated by a cross and runs substantially in the vehicle transverse direction.

The front ends of the tensioning elements 31 to 34 are articulated on the roof frame front part 22 at joints 51, 52, 53, 54. The joints 51 to 54 are spaced at a distance from one another in the vehicle transverse direction and allow the articulated ends of the tensioning elements 31 to 34 to swivel about pivot axes 55, 56, 57, 58 that extend substantially in a Z direction of the passenger car 1. If the vehicle longitudinal direction is denoted as the X direction and the vehicle transverse direction as the Y direction, the Z direction runs perpendicular to the X axis and the Y axis. The pivot axes 55 to 58 preferably are inclined slightly to the Z axis.

The rear ends of the tensioning elements 31, 32 are articulated on the support structure 2 in the rear end area 3 at a common joint 63 on the rear left side. Similarly the tensioning elements 33 and 34 are articulated on the support structure 2 in the rear end area 3 at a common joint 62 on the rear right side. The joints 61, 62 are designed to allow the articulated ends of the tensioning elements to swivel about pivot axes 63, 64. The pivot axes 63, 64 are inclined somewhat to the Z axis of the passenger car 1.

A cornered folding top bow 70 extends between the roof frame side parts 24, 25, and impinges on the tensioning elements 31 to 34 from beneath, that is to say from the vehicle interior, when the folding roof arrangement 10 is in the closed position. The cornered folding top bow 70 is articulated on the roof frame side parts 24, 25 at the joints 71, 72. The associated pivot axes are indicated by crosses and preferably extend in the vehicle transverse direction. The cornered folding top bow 70 comprises a bow cross piece 74, which may be of rigid or elastically deformable design.

Fixing arms 75, 76 extend respectively from the ends of the bow cross piece 74 to the associated roof frame side part 24. The free end of the fixing arm 75 is articulated on the roof frame part section 42 of the roof frame side part 24 at the joint 71. The free end of the fixing arm 76 is fit, for example, flexibly and/or detachably, to the roof frame side part 24 in the area of the joint 44 or at the joint 44. The fixing arm 76 may be a flexible strap that is tensioned only when the folding roof arrangement 10 is in the closed position. When the folding roof arrangement 10 is in the stowed position the fastening strap can simply be folded or collapsed.

Figure 3:
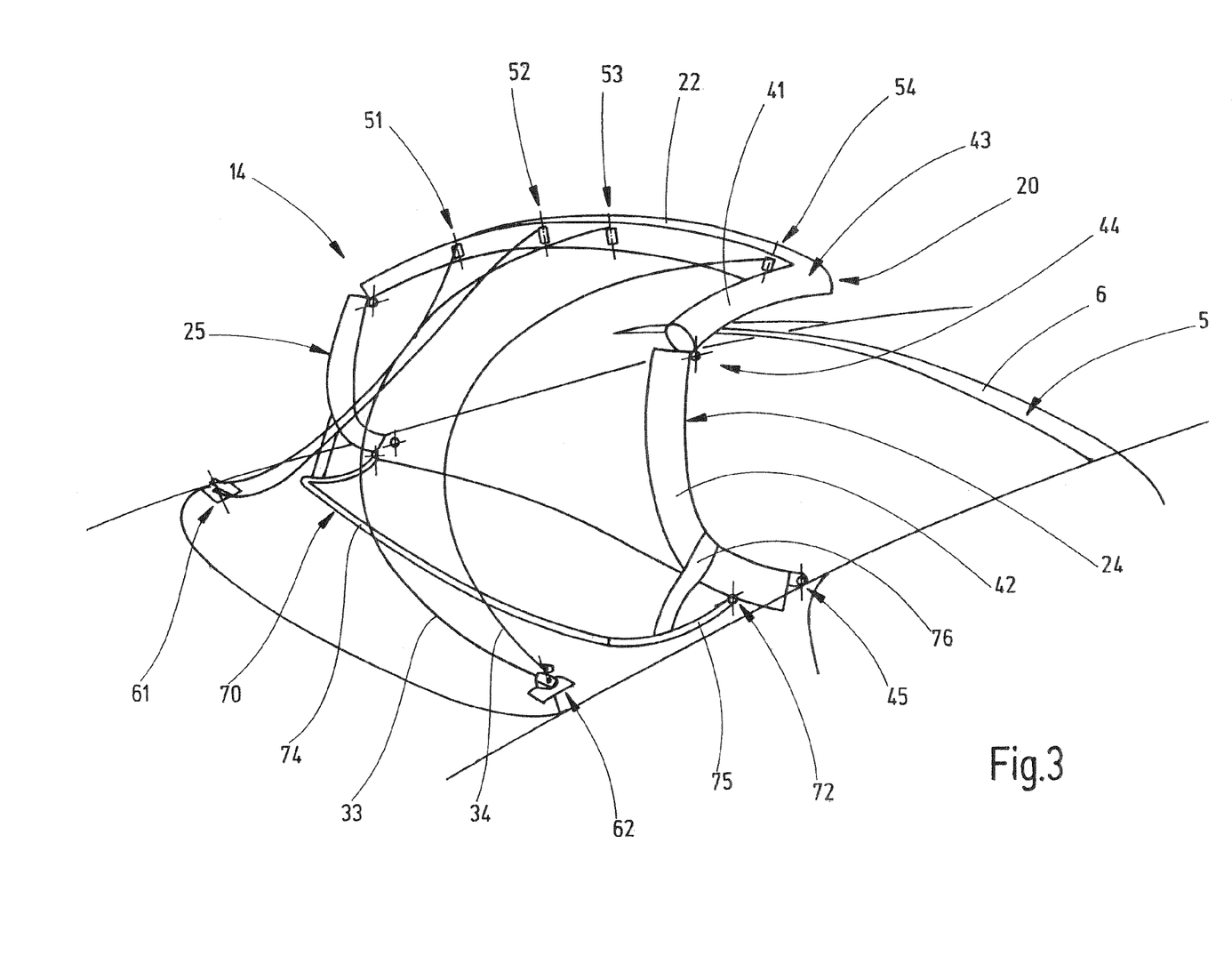
FIG. 3 is an oblique perspective representation similar to FIG. 2 when folding or collapsing the folding top structure.
Figure 4:
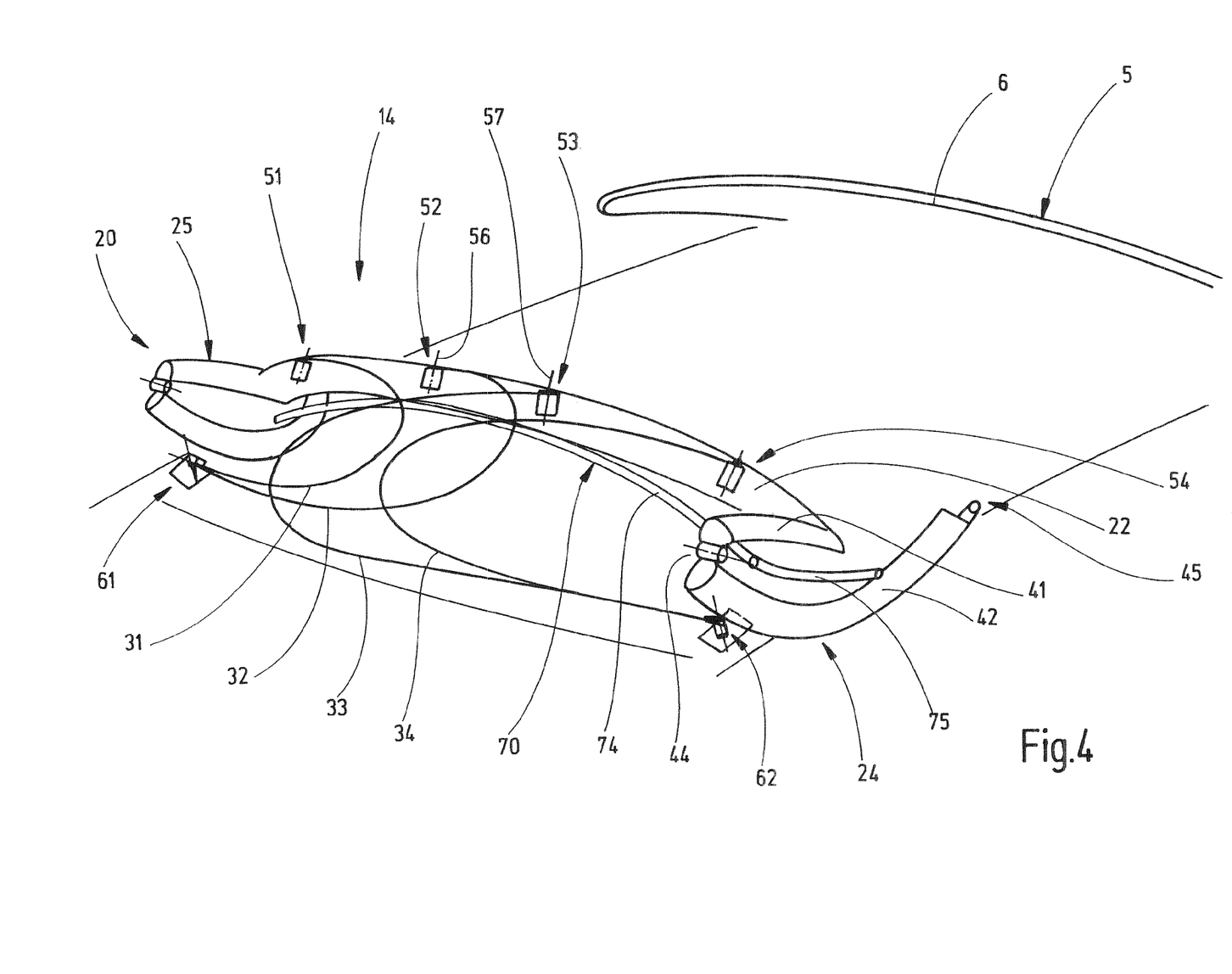
FIG. 4 is an oblique perspective representation similar to FIGS. 2 and 3 with the folding top structure in a stowed position or a position similar to the stowed position.

It can be seen from FIGS. 3 and 4 how the folding top structure 14 is collapsed or folded from the closed position represented in FIG. 2 into a stowed position shown in FIG. 4. In collapsing or folding the structure, the roof frame 20 is folded about the pivot axes at the joints 44. The folded roof frame 20 here is swiveled about the pivot axes at the lateral joints 45. In folding the structure, the tensioning elements 31 to 34 are curved more heavily. In the stowed position the heavily curved tensioning elements 31 to 34 partially overlap one another and are arranged substantially in one plane.

The tensioning elements 31 to 34 each are embodied as elastic bending rods and with the folding roof arrangement 10 in the closed position fulfill the function of a folding top bow. The rapid-folding roof arrangement 10 may be embodied as a removable roof, which in the removed state is folded up and stowed in the vehicle. The folding roof arrangement 10 also may be embodied as a collapsible folding top secured to the vehicle and stowable in a corresponding receiving compartment.

For this purpose the tensioning elements 31 to 34 may be detachably or permanently fitted to the support structure 2 of the passenger car 1. When collapsing, stowing or folding the folding roof arrangement 10, the tensioning elements 31 to 34 assume the link function of an additional linkage provided in conventional folding roof arrangements.

The tensioning elements 31 to 34 also preferably synchronize the stowing movement of the roof frame 20, particularly the roof frame side parts 24, 25. The folding top covering 12 may be secured detachably to the folding top structure 14. The tensioning elements 31 to 34 preferably are secured to the folding top covering 12, and if necessary may be removable together with the folding top covering 12. Alternatively, however, the tensioning elements 31 to 34 may be secured to the folding top structure 14, and the folding top cover 12 may be removed separately from these.

Figure 5:
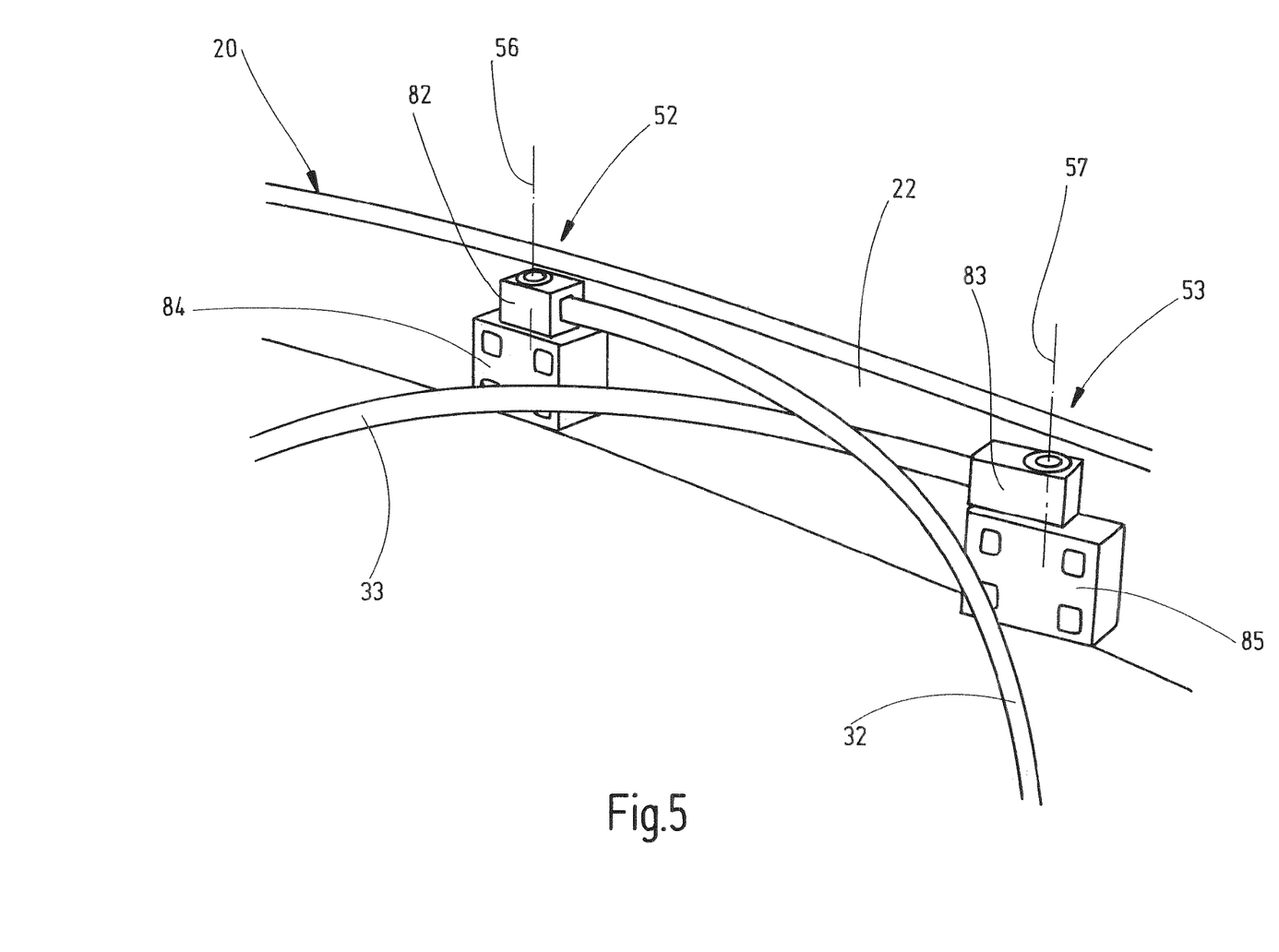
FIG. 5 is an enlarged detail from FIG. 4.

FIG. 5 represents an enlargement of the detail in FIG. 4 showing the joints 52 and 53. The tensioning elements 32, 33 are in the stowed position or virtually in the stowed position. In this position the tensioning elements 32, 33 bear partially on the roof frame front part 22. An end piece 82, 83 is fixed to each of the ends of the tensioning elements 32, 33 shown. The end pieces 82, 83 are supported pivotally on bearing blocks 84, 85, so that the end pieces 82, 83 with the associated ends of the tensioning elements 32, 33 are capable of swiveling about the pivot axes 56 and 57 respectively. The bearing blocks 84, 85 are fixed to the roof frame front part 22 at a distance from one another in a transverse direction. The end pieces 82, 83 may, for example, be pushed and bonded or jammed onto the associated ends of the tensioning elements 32, 33.

Figure 6:
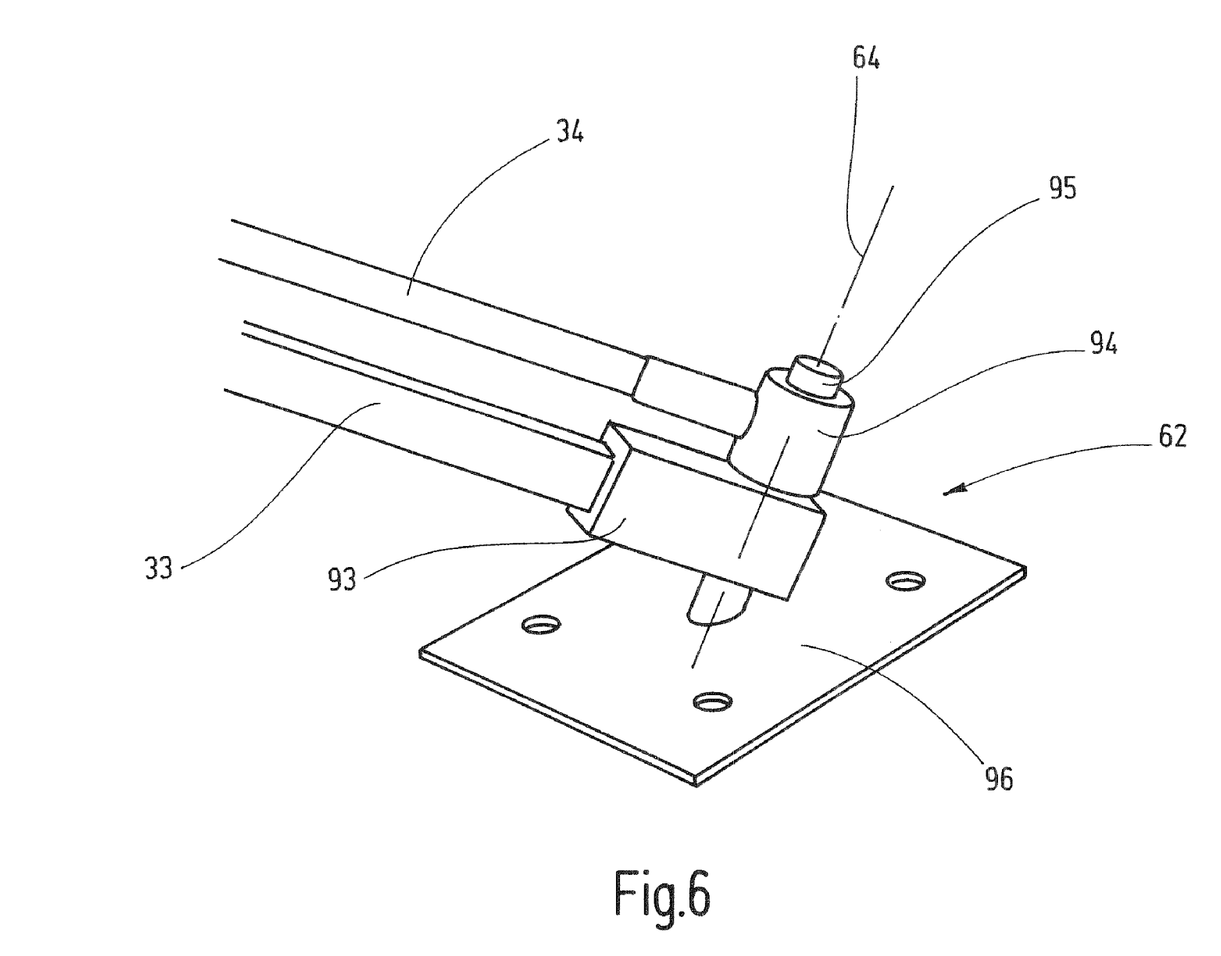
FIG. 6 is an enlarged detail from FIG. 2.

FIG. 6 represents an enlargement of the detail in FIG. 2 showing the joint 62. It can be seen from the enlarged representation that the tensioning element 33 has a rectangular cross section. By contrast, the tensioning element 34 has a circular cross section. A substantially cuboid end piece 93 is fixed to the end of the tensioning element 33. A substantially tubular end piece 94 is fixed to the end of the tensioning element 34. The two end pieces 93, 94 are supported pivotally on a common rocker pivot pin 95, so that they can swivel about the pivot axis 64. The rocker pivot pin 95 emerges from a bearing plate 96 that is fixed to a support structure (not shown) of the motor vehicle.

According to a further aspect of the invention the pivot axes 56, 57; 64 of the tensioning elements are inclined in relation to the Z axis of the vehicle, in such a way that the tensioning elements are stowed or erected controllably under movements of the folding top. According to a further aspect of the invention the pivot axes of the tensioning elements are arranged so that the tensioning elements are pre-tensioned by approximately equal pre-tensioning forces in the stowed position and in the closed position. This arrangement of the pivot axes thus serves to form a mean value between the stowed position and the closed position.

According to a further aspect of the invention the swivel joints or swivel bearings may be equipped with stops, so that the tensioning elements are brought into a defined position or attitude in the stowed position and/or the closed position. This serves to prevent unwanted collisions with adjacent components.

What is claimed is:

1. A folding roof arrangement for a vehicle having a windshield frame, comprising:
    a folding top structure having roof frame side parts hinged to the vehicle rearward of the windshield frame and a roof frame front part extending between the roof frame side parts, the roof frame side parts of the folding top structure being foldable between and open position where the roof frame front part is rearward of the windshield frame and a closed position where the roof frame front part is in proximity to the windshield frame;
    a plurality of elastically deformable tensioning elements, each of the elastically deformable tensioning elements having a front longitudinal end attached to the roof frame front part of the folding top structure at a front joint and a rear longitudinal end attached to a support structure of the vehicle at a rear joint, at least one of the front and rear joints of each of the elastically deformable tensioning elements being configured to pivot about a pivot axis; and
    a folding top covering disposed on the folding top structure and the elastically deformable tensioning elements.

2. The folding roof arrangement of claim 1, wherein the elastically deformable tensioning elements are deformed elastically when the folding top structure is folded.

3. The folding roof arrangement of claim 1, wherein at least one of the elastically deformable tensioning elements of the folding top structure is configured for linking to the vehicle.

4. The folding roof arrangement of claim 1, further comprising an elastically deformable tensioning elements of the folding top structure that defines a folding top bow.

5. The folding roof arrangement of claim 1, wherein at least one of the elastically deformable tensioning elements is pre-tensioned.

6. The folding roof arrangement of claim 5, wherein the elastically deformable tensioning element is pre-tensioned so that a closing movement of the folding top structure is assisted by a pre-tensioning force of the elastically deformable tensioning element.

7. The folding roof arrangement of claim 1, wherein at least one of the elastically deformable tensioning elements extends, at least in part, in a longitudinal direction from the roof frame front part of the roof frame to a rear area of the roof arrangement.

8. The folding roof arrangement of claim 1, wherein at least one of the elastically deformable tensioning elements extends, at least in part, diagonally from the roof frame front part of the roof frame to a rear area of the roof arrangement.

9. The folding roof arrangement of claim 1, wherein the elastically deformable tensioning elements are curved when the folding top structure is in the open position or in the closed position.

10. The folding roof arrangement of claim 1, wherein the front joints are provided at plural points on the roof frame front part.

11. The folding roof arrangement of claim 10, wherein the pivot axes of the front joints on the roof frame front part are inclined in relation to a Z axis that is substantially perpendicular to an X axis extending rearward from the roof frame front part and substantially perpendicular to a Y axis that extends between the roof frame side parts, so that under a folding movement of the folding roof arrangement the tensioning elements perform a defined movement or are definably deformed.

12. The folding roof arrangement of claim 1, wherein the roof frame comprises two roof frame side parts each of which has a first end attached to the roof frame front part.

13. The folding roof arrangement of claim 12, wherein each of the roof frame side parts has a second end attached to a support structure of the vehicle.

14. The folding roof arrangement of claim 13, wherein each of the roof frame side parts comprises at least two roof frame side part sections articulated to one another.

15. The folding roof arrangement of claim 1, wherein the folding top covering is detachably fit to the folding top structure.

16. The folding roof arrangement of claim 1, wherein each of the elastically deformable tensioning elements is an elastically bendable rod.

17. The folding roof arrangement of claim 16, wherein the bendable rod has a substantially circular cross section.

18. The folding roof arrangement of claim 1, wherein the elastically deformable tensioning elements are attached to the rear joints at the support structure for pivoting about pivot axes inclined to a Z axis that is substantially perpendicular to an X axis extending rearward from the roof frame front part and substantially perpendicular to a Y axis that extends between the roof frame side parts so that the tensioning elements perform a defined movement under a folding movement of the folding roof arrangement.

* * * * *